United States Patent

Labesky

[11] Patent Number: 5,833,776
[45] Date of Patent: Nov. 10, 1998

[54] METHOD OF MAKING A BELLEVILLE SPRING

[75] Inventor: Matthew John Labesky, Warren, Pa.

[73] Assignee: Barnes Group Inc., Bristol, Conn.

[21] Appl. No.: 688,660

[22] Filed: Jul. 29, 1996

[51] Int. Cl.⁶ ................................. C21D 9/02; F16F 1/34
[52] U.S. Cl. ................ 148/580; 29/896.9; 29/896.91; 267/161; 403/294; 403/381
[58] Field of Search .................... 29/896.9, 446, 29/896.91, 896.93, 896.41, 896.411, 896.42; 267/161, 162, 164; 148/580; 63/11; 403/294, 381

[56] References Cited

U.S. PATENT DOCUMENTS

| 438,822 | 10/1890 | Philion | 403/381 |
|---|---|---|---|
| 819,866 | 5/1906 | Dobson | 403/381 |
| 2,236,206 | 3/1941 | Becker | 148/580 |
| 3,259,383 | 7/1966 | Johnson et al. | |
| 3,668,917 | 6/1972 | Komatsu et al. | 148/580 |
| 4,039,354 | 8/1977 | Schober | 148/16.5 |

FOREIGN PATENT DOCUMENTS

| 1953280 | 8/1970 | Germany | 29/896.9 |
|---|---|---|---|
| 1-180727 | 7/1989 | Japan | 29/896.9 |
| 1248473 | 10/1971 | United Kingdom . | |
| 2204935 | 11/1988 | United Kingdom | 267/162 |

OTHER PUBLICATIONS

"Belleville Spring Washers" Published by Associated Springs—pp. 71–77.

Primary Examiner—P. W. Echols
Attorney, Agent, or Firm—Vickers, Daniels & Young

[57] ABSTRACT

A Belleville spring comprising a thin strip of hardened spring steel coiled into a circular shaped body with a frusto-conical configuration having an inner diameter and an outer diameter, wherein the strip has two free ends and the coiled spring steel body has the free ends joined together.

15 Claims, 9 Drawing Sheets

METHOD OF MAKING A BELLEVILLE SPRING

This application relates to the art of Belleville springs and more particularly to a novel Belleville spring and the method used for producing such spring.

BACKGROUND OF INVENTION

Springs of the Belleville type have been used for various applications and constitute circular elements of spring steel having a generally frusto-conical shape with an inner periphery which is spaced axially from the plane of the outer spring periphery so that the force applied axially against the spring causes the inner periphery to move toward the outer periphery to place the spring under compression. This movement of the frusto-conical spring steel element in an axial direction causes the spring to generate a restoring force proportional to the applied load, which restoring force is not uniform over the relatively small movement of a frusto-conical spring. Belleville springs are used in many applications and are produced by the millions for a wide variety of mechanical devices, such as transmissions for automobiles, etc. Since Belleville springs are mass produced components, the reduction in the overall cost of manufacturing a Belleville spring, even if relatively small, translates into substantial gross cost savings.

Belleville springs have heretofore been formed by blanking a flat, washer like, ring from a sheet of plain carbon steel that is normally cold rolled. After the flat ring of carbon steel is stamped or punched from the steel sheet or strip, it is pressed formed into a truncated conical shape by applying pressure through matching dies. The frusto-conical steel element is heated to a relatively high temperature, approaching 2,000° F., and is subsequently quench hardened to create the spring characteristics in the frusto-conical element. Quench hardening is often followed by heating and cooling steps to stress relieve the spring, reduce distortions in the spring, obtain the desired final hardness and to set the spring into its final shape. This general manufacturing procedure is employed in making Belleville springs. The manufacture of such springs results in a considerable amount of scrap material, especially in larger sizes above about a 2.0 inches in diameter for the inner periphery, where the metal content of the Belleville spring is often 30–50% of the price of the spring itself Due to stamping of the ring shaped blank used in forming the Belleville spring from strip steel, the edges of the part have the normal burrs and shear marks. When the formed component is heat treated, the edges of the stamped sheet metal blank can become very brittle due to minute cracks. These cracks must be removed by costly and time consuming procedures, such as tumbling or grinding, which smooths the edges to increase the fatigue life of the Belleville spring. Thus, the amount of metal waste, the resulting burrs and stress cracks in the stamped edges of the spring and other problems experienced in manufacturing Belleville springs substantially add to the cost of these mass produced springs. The present invention relates to an improvement in manufacturing of Belleville springs, which improvement reduces scrap, avoids the deleterious effect of edge imperfections caused by stamping and heat treating and results in a Belleville spring having the desired technical parameters or characteristics.

INCORPORATION BY REFERENCE

In the brochure entitled *Belleville Spring Washers* published by Associated Spring, at pages 71–77, the structure and operation of Belleville springs are described; therefore, this brochure is incorporated by reference so that the technology associated with Belleville springs need not be repeated. Also incorporated by reference is Johnson U.S. Pat. No. 3,259,383, illustrating a particular type of Belleville spring, and Schober U.S. Pat. No. 4,039,354 describing the method of making Belleville springs and improvement in that method involving controlling the carbon in the steel used for stamping and forming Belleville springs.

THE INVENTION

In accordance with the present invention, there is provided a Belleville spring comprising a thin strip of spring steel coiled into a circular shaped body with a frusto-conical configuration with an inner diameter, or periphery, and an outer diameter, or periphery, wherein the strip has two free ends adjacent each other. In accordance with another aspect of the invention, the Belleville spring formed from coiled spring steel includes an arrangement for releasably joining the free ends to form the circular shape of the spring. The preferred arrangement uses interlocking elements on each of the free ends so that the elements can be releasably joined into the circular configuration of a Belleville spring. After the ends are joined and placed in use, the free ends are held in their interlocked relationship. In accordance with another aspect of the invention, the two free ends of a coiled spring steel are fixedly secured to each other by techniques, such as welding or adhesion. Since the Belleville spring is formed by forceably coiling a straight, thin strip of spring steel into the circular shaped body, the spring is not produced by the stamping process, which has heretofore resulted in substantial material waste and edge imperfections. The edges of the forceably coiled strip of spring steel are smooth or contoured and need not be subsequently tumbled or ground to remove burrs or other edge imperfections. Since the Belleville spring is formed from an elongated strip of spring steel, there is no need for the heat treatment to convert the unhardened Belleville spring into a hardened spring. The strip itself is a spring which is hardened before passing through a standard coiler, such as a coiler used in producing snap rings. Consequently, the invention includes a forceably coiled frusto-conical configuration having free ends. In accordance with the preferred embodiment of the invention, the hardened spring steel is coiled into a flat configuration, similar to a snap ring, and then heat set into the desired frusto-conical configuration. As an alternative arrangement, the forming or coiling of the hardened spring steel can be at a desired vertical angle which will automatically produce convolutions having a frusto-conical configuration to be merely cut into lengths to define the free ends of the novel Belleville spring of the invention.

In accordance with another aspect of the invention, there is a method of making a Belleville spring comprising the steps of mechanically coiling a flat strip of hardened spring steel into a continuous, generally flat circular configuration, wherein the strip has first and second parallel edges defining the width of the strip. The coiler produces a coiled convolution of the hardened spring steel strip with a preselected radius of curvature that is formed around an axially extending center of generation, wherein the first edge, or periphery of the convolution, has a first radius and the second edge, or periphery of the convolution, has a second radius. In accordance with this aspect of the invention, the coiling operation produces a flat hardened ring of spring steel, wherein the peripheries have radii different from each other by an amount generally equal to the width of the coiled spring steel strip. Thus, the strip is coiled into a flat configuration preparatory to cutting the spring steel strip of the circular convolution to create a generally flat shaped spring, with first and second free ends. Thereafter, the flat ring shaped hardened spring steel is shaped, under pressure, into the frusto-conical shape with the two free ends joined together. In accordance with a further aspect of the invention, the free ends are interlocked and/or permanently fixed to each other prior to the forming operation. In addition, the forming operation is performed in a die which is heated to a temperature generally less than about 1,000° F. The spring is held in the frusto-conical shape defined by the die for a time generally in the range of 1.0–2.0 minutes. This procedure or heat set operation takes the flat hardened spring steel ring, with the ends joined together, and shapes the ring into a frusto-conical configuration defining a Belleville spring.

As an alternative form of the present invention, the mechanical coiling of the flat strip of hardened spring steel into a continuous, generally circular, convolution is done in a mechanical coiler which is adjusted to automatically produce the frusto-conical shape so the difference between the radii of the edges of the coiled hardened strip is substantially less than the width of the strip. Thus, the circular convolutions are each produced with a frusto-conical shape. The convolutions resulting from this frusto-conical coiling process, which is done by standard equipment, are cut into circular configurations to define first and second free ends of the profiled, coiled spring steel strip. Then, the free ends are joined together into a frusto-conical Belleville spring, without the need for a heat set operation, as employed in the preferred embodiment of the present invention. In both methods, hardened spring steel having a desired radius of curvature is coiled from a straight spring strip by a standard spring coiler. The resulting circular convolutions are cut into individual rings having free ends which are joined together to form a Belleville spring. In the first embodiment of the invention, the coiled spring strip produces a flat element, which is subsequently heat set into the desired frusto-conical shape. In the second embodiment, the coiling operation itself produces the frusto-conical convolutions, which are cut and then joined into the Belleville spring. In both instances, the final Belleville spring is a coiled strip having a frusto-conical configuration, with free ends that are either interlocked, brought together or fixedly secured together into a Belleville spring. In some instances, it is possible that the Belleville spring does not have its free ends joined together since they will be held together in most applications for Belleville springs.

By using the present invention, especially for large Belleville springs having internal peripheries with diameters greater than about 2.0 inches, there is a considerable savings in scrap over the prior process of stamping a ring from a steel sheet, forming the stamped ring into a frusto-conical configuration and then heat treating the resulting structure to increase its hardness to impart a spring condition. By using the present invention, the cost of the metal will only be approximately 10–20% of the cost of the spring. This is compared to 30–50% of the cost of metal for previous methods of manufacturing Belleville springs. In the past, much of the metal cost is the result of scrap. By using the present invention, the flat strip or flat wire used to make the spring has a deburred or smooth rounded edge before the strip is coiled. This strip is hardened before being formed into a ring and is coiled from a straight configuration to a circular configuration by a standard coiler. Consequently, the manufacturing process eliminates the need to tumble the parts, as required when the ring used to make the spring is stamped from a flat sheet. Thus, the present invention eliminates the need for tumbling or deburring, which saves the cost of such operation and reduces handling costs. After the spring strip has been coiled about a given center of curvature with a selected radius, the convolutions can overlap each other and be cut to form the free ends or the free end can be stamped or cut separately. In each instance, the free ends will have an interlocking dovetail or some other arrangement, for joining the free ends into a circular configuration resulting in a Belleville spring. It has been found that joining of the free ends of the coiled hardened spring steel into a Belleville spring configuration obtains the characteristics of a typical stamped and heat treated Belleville spring.

As an example of a Belleville spring constructed in accordance with the present invention, a hardened strip of SAE 1074 carbon steel having a thickness of 0.043 inches and a width of 0.325 inches was forceably coiled into a convolution having an inside diameter, or periphery, of 5.098 inches and an outside diameter, or periphery, of 5.748 inches. This frusto-conical Belleville spring had dovetailed or interlocking free ends held together. A test fixture was used to compare this split Belleville spring with a standard continuous ring Belleville spring. It was found that the characteristics of the example and a continuous stamped Belleville spring were essentially the same. They both had a height to thickness ratio of 1.9. The Belleville spring, produced in accordance with the present invention, was fatigue tested between the heights of 0.083–0.048 inches for 2,500,000 cycles without failure. The tensile stress on the outside diameter of the new Belleville spring was approximately 83,000 psi at a height of 0.083 inches and 126,000 psi at a height of 0.048 inches using standard Belleville design parameters. This test of the example revealed that a Belleville spring that is frusto-conical in configuration and has two free ends joined together operates substantially the same as a stamped Belleville spring which is continuous in configuration. Consequently, the use of the present invention, which employs forceably coiling of a spring strip into a circular configuration, with or without a simultaneous frusto-conical contouring, to produce free ends that are subsequently joined will result in the same springing action as a standard continuous Belleville spring.

The present invention is particularly applicable for Belleville springs which are large in diameter and operate in a low stressed environment. Two arrangements are employed for practicing the present invention. In one instance, the spring steel is coiled into a frusto-conical configuration which has overlapping convolutions. A punches of a die set stamp through these convolutions to form the first and second free ends of the Belleville spring. Thereafter, the Belleville spring is merely stress relieved.

In accordance with the preferred embodiment of the present invention, the hardened spring steel is distorted transversely like a snap ring to form the convolutions. The interlocking elements are then stamped by a die set passing through the overlapping convolutions, the split ring is joined at its free ends and heat set under pressure. In both embodiments, the starting spring steel strip, or wire, is a hard drawn steel strip of oil tempered material with a hardness of at least 43–48 C on the Rockwell C scale. By using a hardened spring steel, the coiler forms the circular body of the spring in a form having a selected radius. During the heat setting operation, when the convolution is formed into a frusto-conical shape, the hardness is reduced by about 5–10 points on the Rockwell C scale. Thus, the resulting Belleville spring has a hardness of approximately 30–40 C on the Rockwell scale. The spring in some instances may be formed directly off of the coiler or may be removed from the coiler and then heat set.

The primary object of the present invention is the provision of a Belleville spring, which spring is coiled into shape and cut to form free ends which are abutting, interlocked or fixed to complete the circular spring.

Another object of the present invention is the provision of a method of making a Belleville spring, which method involves coiling of circular configurations from hardened spring wire, or flat strip, cutting the convolutions into circular configurations having free ends and then joining the free ends into a Belleville spring in a fashion, which involves interlocking, abutting, and/or fixing the free ends together.

Another object of the present invention is the provision of a Belleville spring and method of making a Belleville spring, which reduces the scrap, does not result in edge imperfections and is substantially less expensive than normal springs which are formed from stamped components.

These and other objects and advantages will become apparent from the following description taken together with the accompanying drawings.

PREFERRED EMBODIMENT

Figure 1:
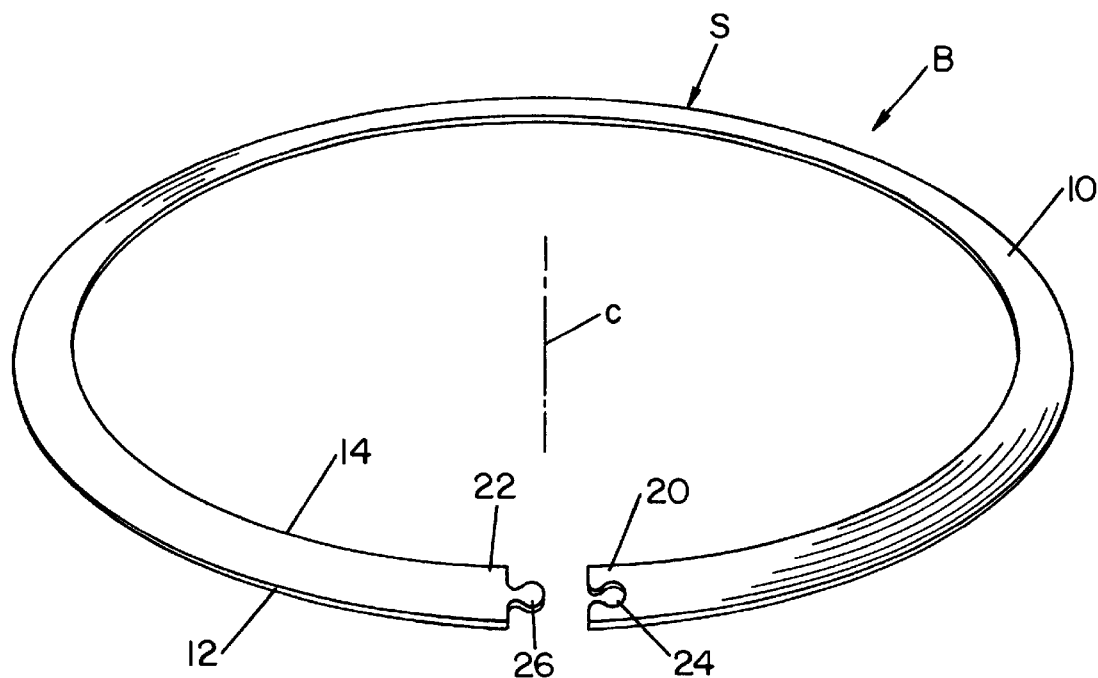
FIG. 1 is a pictorial view of a Belleville spring constructed in accordance with the present invention, showing the free ends with interlocking elements spaced apart.
Figure 2:
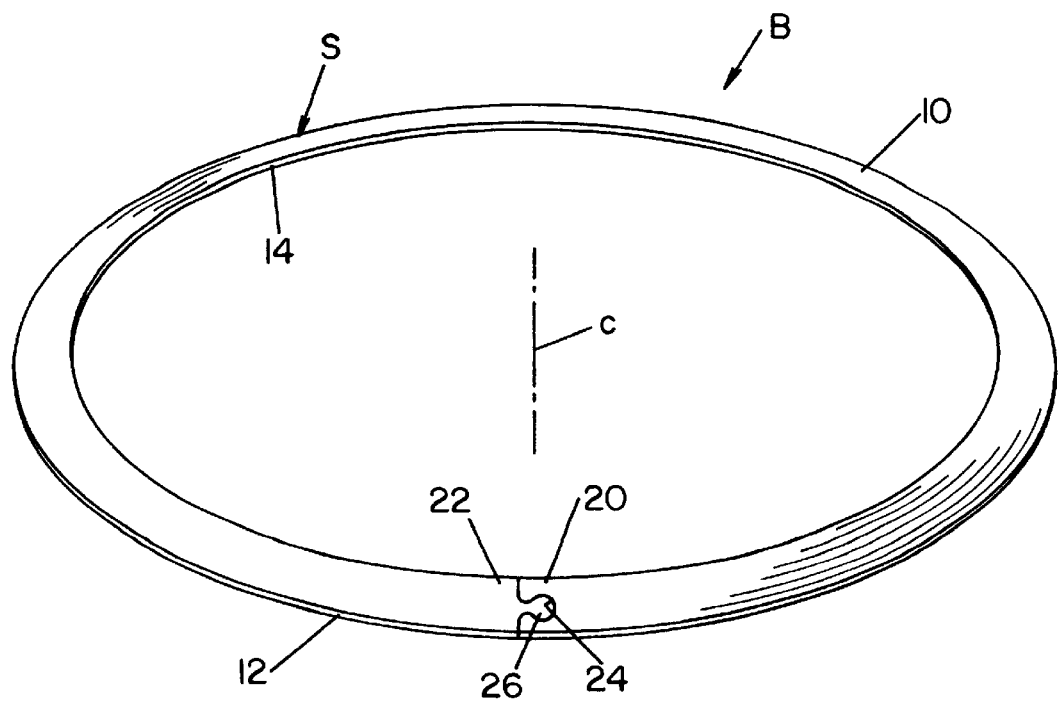
FIG. 2 is a pictorial view, similar to FIG. 1, showing the Belleville spring with the free ends interlocked as the spring is assembled for use.
Figure 3:
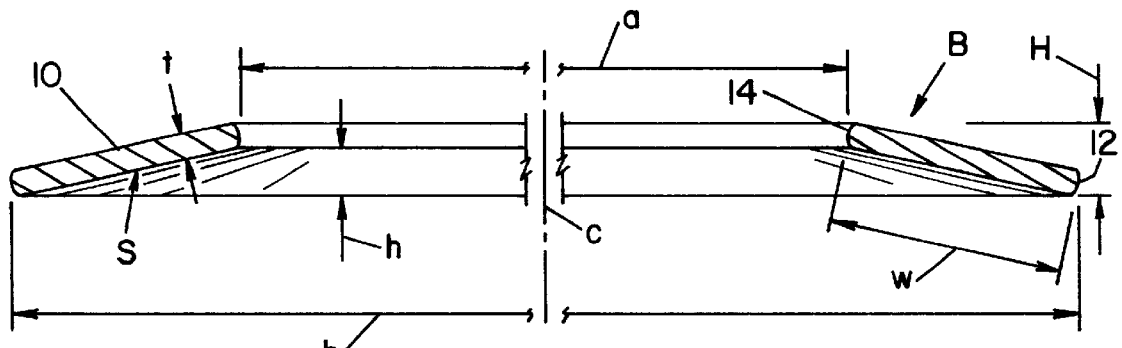
FIG. 3 is a cross sectional view of a Belleville spring showing the normal parameters of a Belleville spring.

Referring now to the drawings wherein the showings are for the purpose of illustrating preferred embodiments of the invention only, and not for the purpose of limiting same, FIG. 1 illustrates a Belleville spring B, in the form of a circular body 10 formed from coiled, hardened spring steel strip S having free ends 20, 22 with interlocking or dovetail elements, illustrated as female element 24 and male element 26. In use of the Belleville spring, the free ends are interlocked or held together by elements 24, 26 to form the frusto-conical configuration of a Belleville spring, as shown in FIG. 2. This spring is used in the same applications of any Belleville spring. It is not necessary to securely affix the interlocking or dovetail elements; however, these elements can be fixed by welding, adhesion or otherwise. When Belleville spring B has been constructed in accordance with the present invention it has the side profile illustrated in FIG. 3. The spring B is frusto-conical in configuration with a circular body 10 formed from hardened spring steel strip S, which strip has a width w and thickness t. The frusto-conical configuration creates an inner circular periphery 14, with a diameter a, and an outer circular periphery 12, with a diameter b. The overall height h is from the top of the Belleville spring to the bottom plane of outer periphery 12. The height H is the basic parameter taken together with the thickness t, which defines the operating characteristics of Belleville spring B. In practice, the ratio of h/t is in the general range of 1.4–1.6, which ratio allows Belleville spring B to operate at substantially constant load between about 50% deflection up to 100% deflection, i.e. flat.

Figure 4:
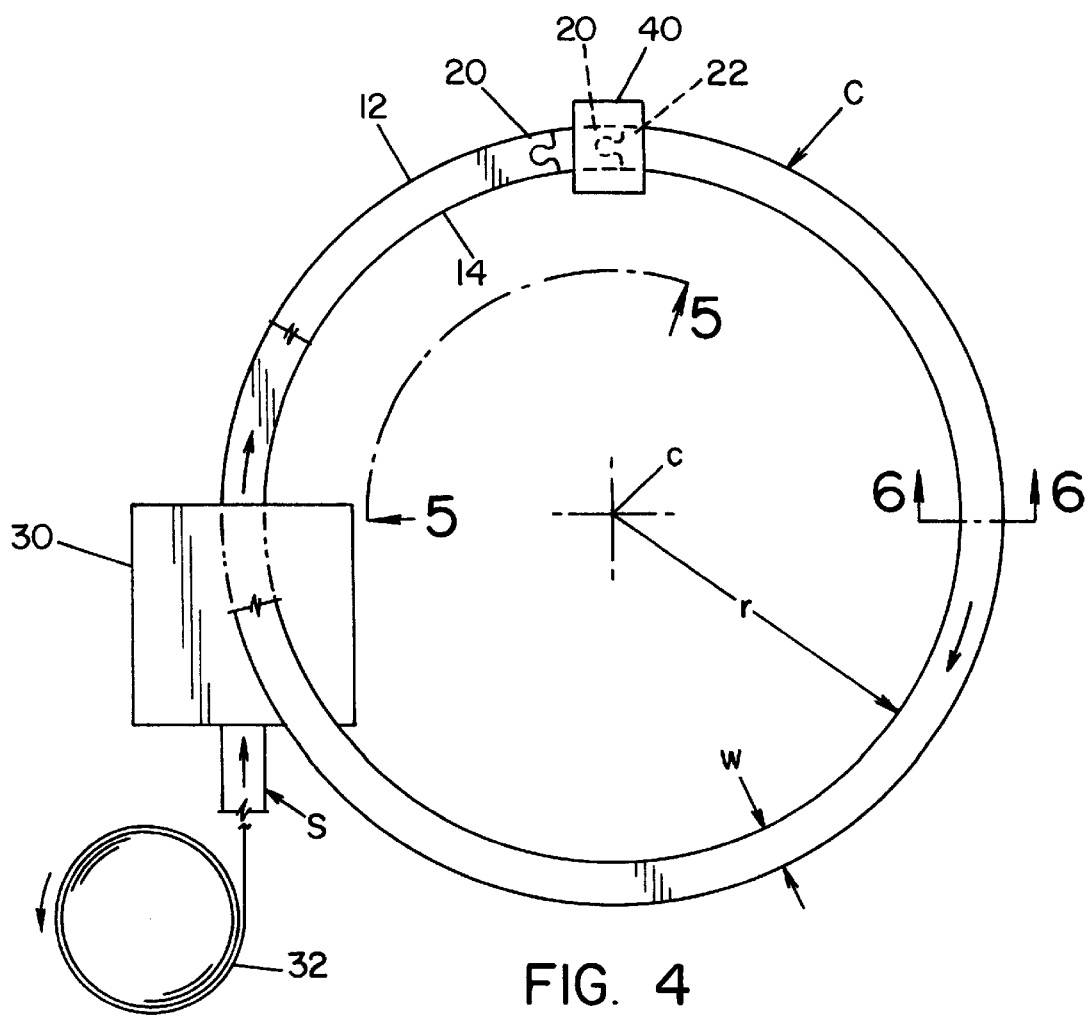
FIG. 4 is a top plan view of the apparatus and method for forming a Belleville spring in accordance with the present invention showing the circular convolutions from a coiler, which convolutions are cut to create free ends.
Figure 5:
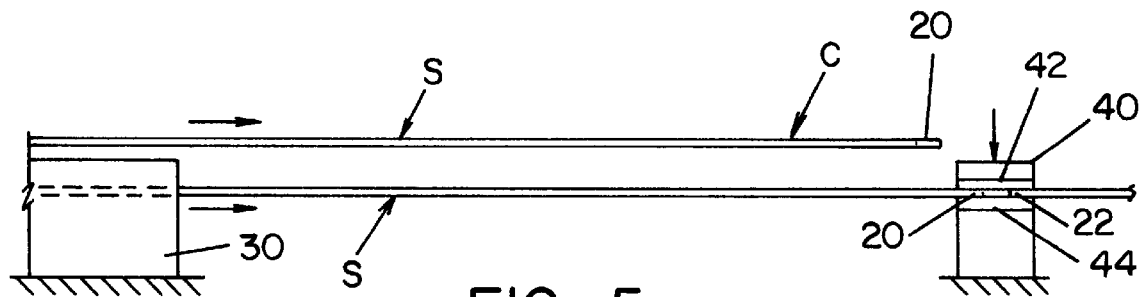
FIG. 5 is a side partial view taken generally along line 5—5 of FIG. 4.
Figure 7:
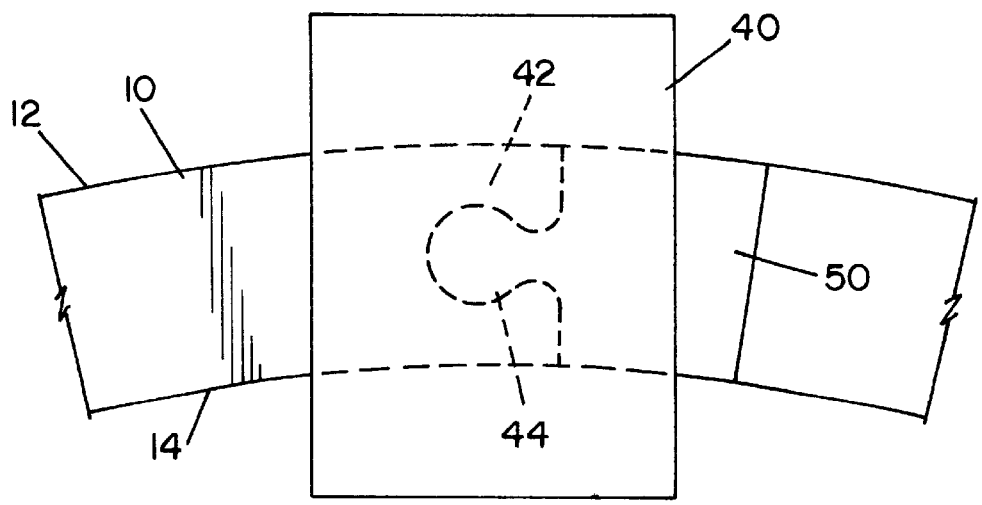
FIG. 7 is a top enlarged plan view of the die cutting station illustrated in FIG. 4.

In FIG. 4, the method and apparatus for constructing the Belleville spring B is schematically illustrated. A standard snap ring coiler 30 coils flat strip S, stored on spool 32 which spool is rotated at 90° to show the supply of strip S. The strip is curved about radius r in a direction transverse to width w and perpendicular to thickness t. Strip S is hardened to provide a spring steel strip. Such hardness, in practice, is approximately 43–48 C on the Rockwell C scale when SAE 1074 carbon steel is employed as in the previously discussed example. Flat strip S, which in practice has a width of 0.325 inches and a thickness of 0.043 inches, is coiled into a circular shape having radius r which in practice is at least 1.0 inches. As strip S is passed through snap ring coiler 30 it is deflected transversely into convolution C around a center of curvature c with a radius r so that the convolutions continue to overlap one over the other as the strip issues from coiler 30. To form free ends 20, 22, a die cutting station 40 is provided. This station has reciprocal dies that cut both ends 20, 22 simultaneously, or in succession. As shown in FIG. 7, die cutting elements 42, 44 are moved downwardly against body 10, after a small end 50 of strip S has been passed through cutting station 40. A die 40 having die elements 42, 44 moves downwardly, which action cuts both the female and male elements of the free ends 20, 22. In that instance, portion 50 is scrap and is formed in each stamping operation. Another arrangement for cutting the elements 24, 26 involves cutting a single layer of strip S at any given time. This procedure is shown in FIG. 5. After the cut has been made by the die elements 42, 44, the previously cut free end 20 coacts with the subsequently cut free end 22. Thereafter, new free end 20 progresses around the convulation C into an overlapping position as shown in FIG. 5. Each cut produces the interlocking element at the end of the circular convulation for coaction with the previously cut end; consequently, no scrap is produced. The profile for the upper die element 42 and the lower die element 44 is the shape shown in dotted lines in FIG. 7. The elements are the upper and lower die elements shown in FIG. 5. Use of these die sections could be employed for cutting simultaneously, as shown in FIG. 7, or cutting in sequence, as shown in FIG. 5. Other stamping procedures could be used to cut the ends of the convolutions to make a split ring shaped spring. Irrespective of the form of cutting, the strip S has free ends 20, 22 with interlocking elements 24, 26 as shown in FIG. 8.

Figure 8:
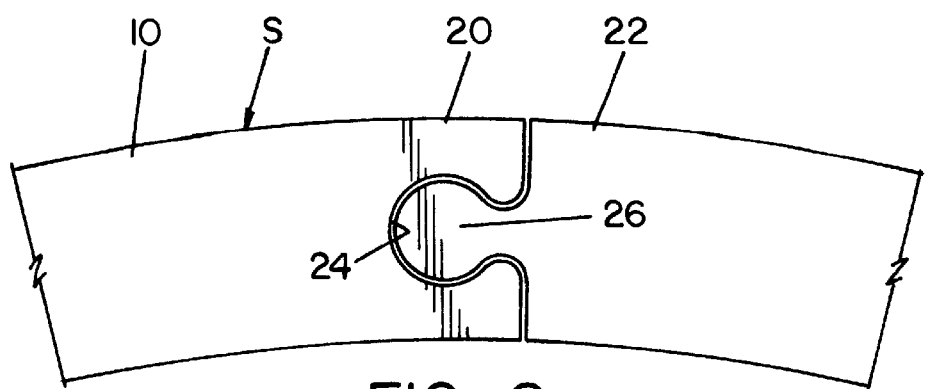
FIG. 8 is an enlarged portion of the free ends of a Belleville spring constructed in accordance with the present invention showing the interlocking elements stamped out by the die cutting station schematically illustrated in FIG. 7.
Figure 9:
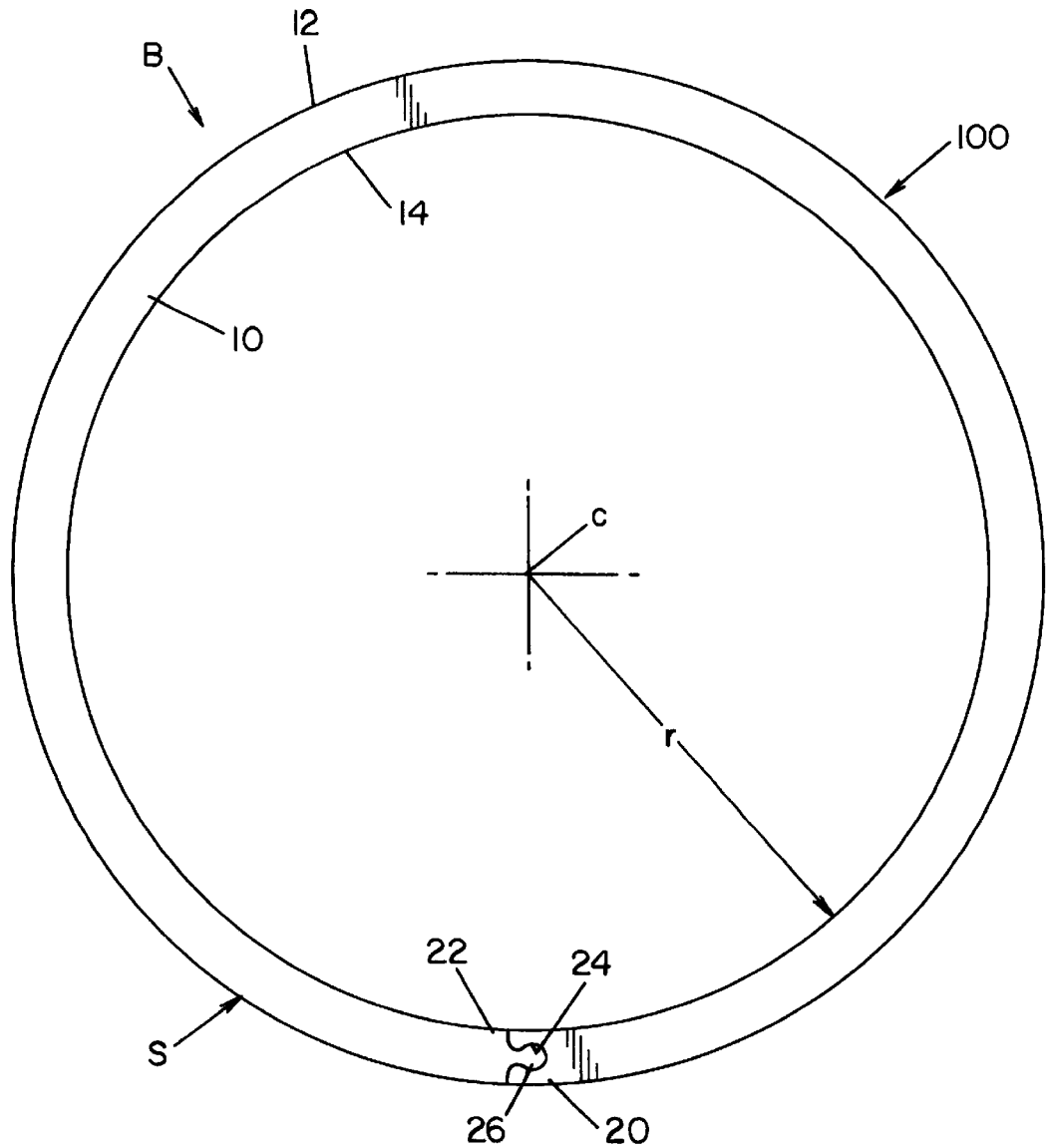
FIG. 9 is a top plan view of a circular preform with the free ends interlocked and having a flat configuration preparatory to heat setting in accordance with an aspect of the present invention.
Figure 10:
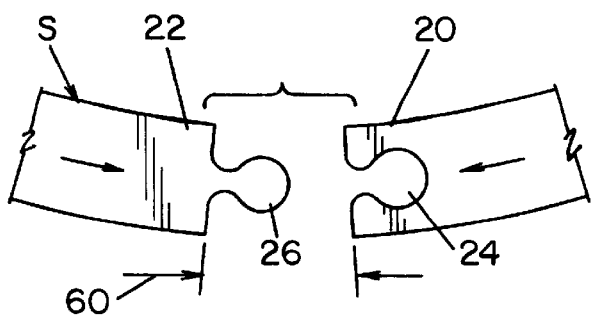
FIG. 10 is a view of the interlocking elements on the free ends of a Belleville spring showing an embodiment of the invention wherein the free ends of a spring at rest have a slight gap preparatory to interlocking as shown in FIG. 9.

After the ends 20, 22 have been cut at die station 40, the two ends are joined as shown in FIG. 8. This joining action provides a flat coiled blank or preform 100, as shown in FIG. 9. In the cutting procedure shown in FIG. 5, it is possible to create a spacing or gap 60, as shown in FIG. 10. This spacing is closed when element 26 is moved into interlocking relationship with element 24. The simultaneous cutting operation shown in FIG. 7 does not produce gap 60. Gap 60 can be of some value in providing a certain amount of holding tension on the interlocking action between elements 24, 26.

Figure 6:
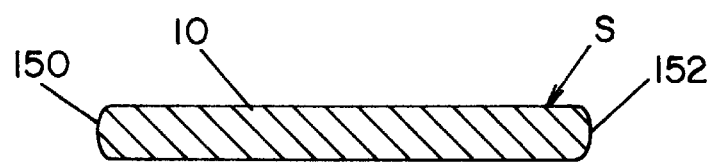
FIG. 6 is an enlarged cross-sectional view taken generally along lines 6—6 of FIG. 4.
Figure 11:
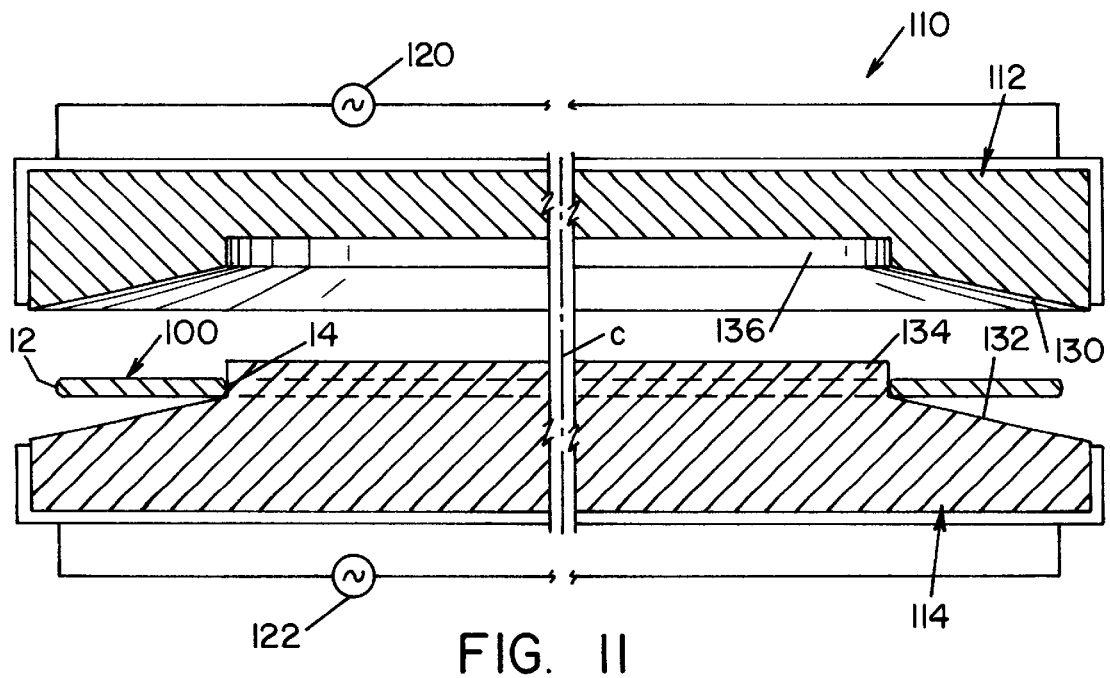
FIG. 11 is a cross sectional view of the heat set forming dies with the flat preform as shown in FIG. 9 in place for heat setting of the Belleville spring.
Figure 12:
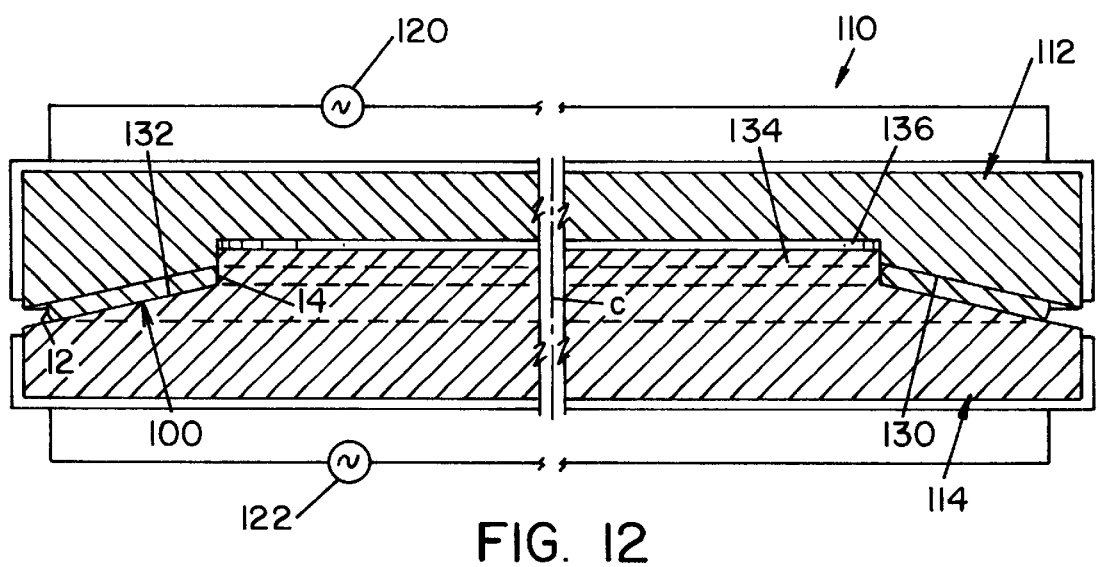
FIG. 12 is a view similar to FIG. 11 with the heat set and forming die in the forming position.

The flat coiled ring of hardened spring steel is preform 100 shown in FIG. 9. This preform is formed into the frusto-conical configuration, as shown in FIGS. 1 and 2, by a pressure and heat processing schematically illustrated in FIGS. 11 and 12. Heat set press 110 has an upper platen 112 and a lower platen 114. Electrical sources 120, 122 create energy to heat the platens to the desired heat set temperature, which temperature is in the range of 800° F.–1,000° F. In the example explained in this disclosure, the temperature is approximately 900° F. Upper platen 112 has a die element with a conical surface 130. In a like manner, lower platen 114 has a die member with a conical surface 132. The lower die member has an upwardly extending cylindrical boss 134 generally matching inner periphery 14 of blank or preform 100. Boss 134 extends into cylindrical recess 136, which provide clearance for the boss when platen 112 is moved from the loading position shown in FIG. 11 to the forming position shown in FIG. 12. Preform 100 is formed into a frusto-conical shape, as shown in FIG. 12, and is held in the forming position for a prolonged time which, in practice, is in the general range of 1.0–2.0 minutes. Blank or preform 100 in its flat condition has ends 20, 22 interlocked by element 24, 26. After the heat set cycle which employs a selected temperature and a selected time, platen 112 is shifted upwardly into the loading position, as shown in FIG. 11. This results in a frusto-conical Belleville spring as shown in FIGS. 1 and 2. In this embodiment of the invention, flat hardened spring steel strip is first formed transversely into convolutions C which are cut to create the flat interlocked preform 100. This preform is then formed by heat and pressure into a Belleville spring. In FIG. 6, edges 150, 152 are contoured to have a smooth arcuate configuration. Thus, these edges 150, 152 need not be machined during the manufacturing process to remove surface imperfections.

Figure 13:
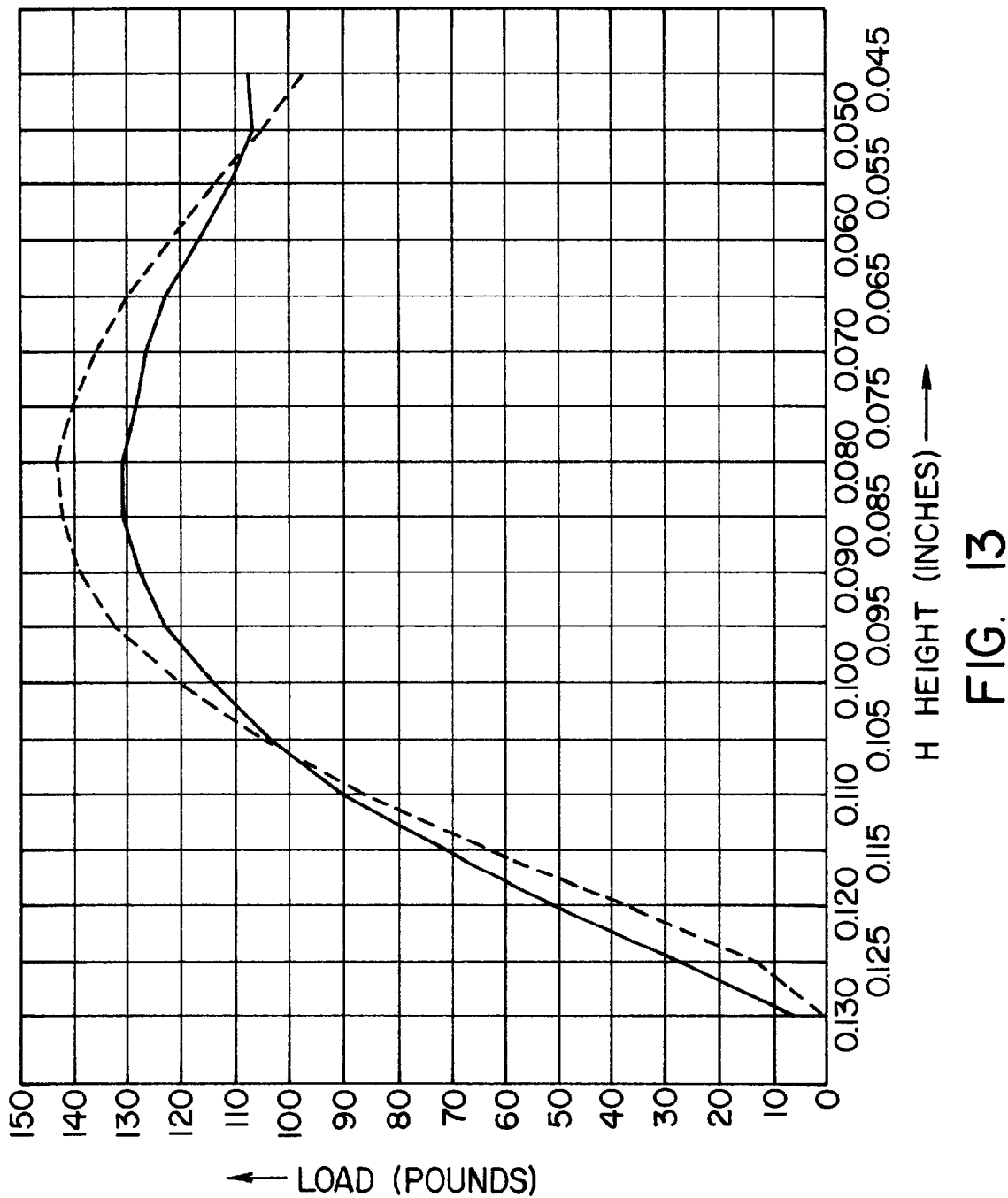
FIG. 13 is a graph showing a comparison between the sample discussed above and a standard Belleville spring.

FIG. 13 is a graph showing the load characteristics for a Belleville spring constructed in accordance with the present invention which is illustrated by the solid line curve of the graph. This curve is compared to the dashed line curve of the graph, which second curve represents a standard stamped circular Belleville spring. As can be seen, as overall height H decreases, from 0.130 inches to 0.045 inches, both springs operate substantially in accordance with the same load characteristics. The example of the invention has an inside diameter of 5.098 inches and is formed from a hardened spring metal strip with a width w of 0.325 inches and a thickness t of 0.43 inches. These same dimensional characteristics were employed for the standard Belleville spring represented by the dashed line curve in FIG. 13.

Figure 14:
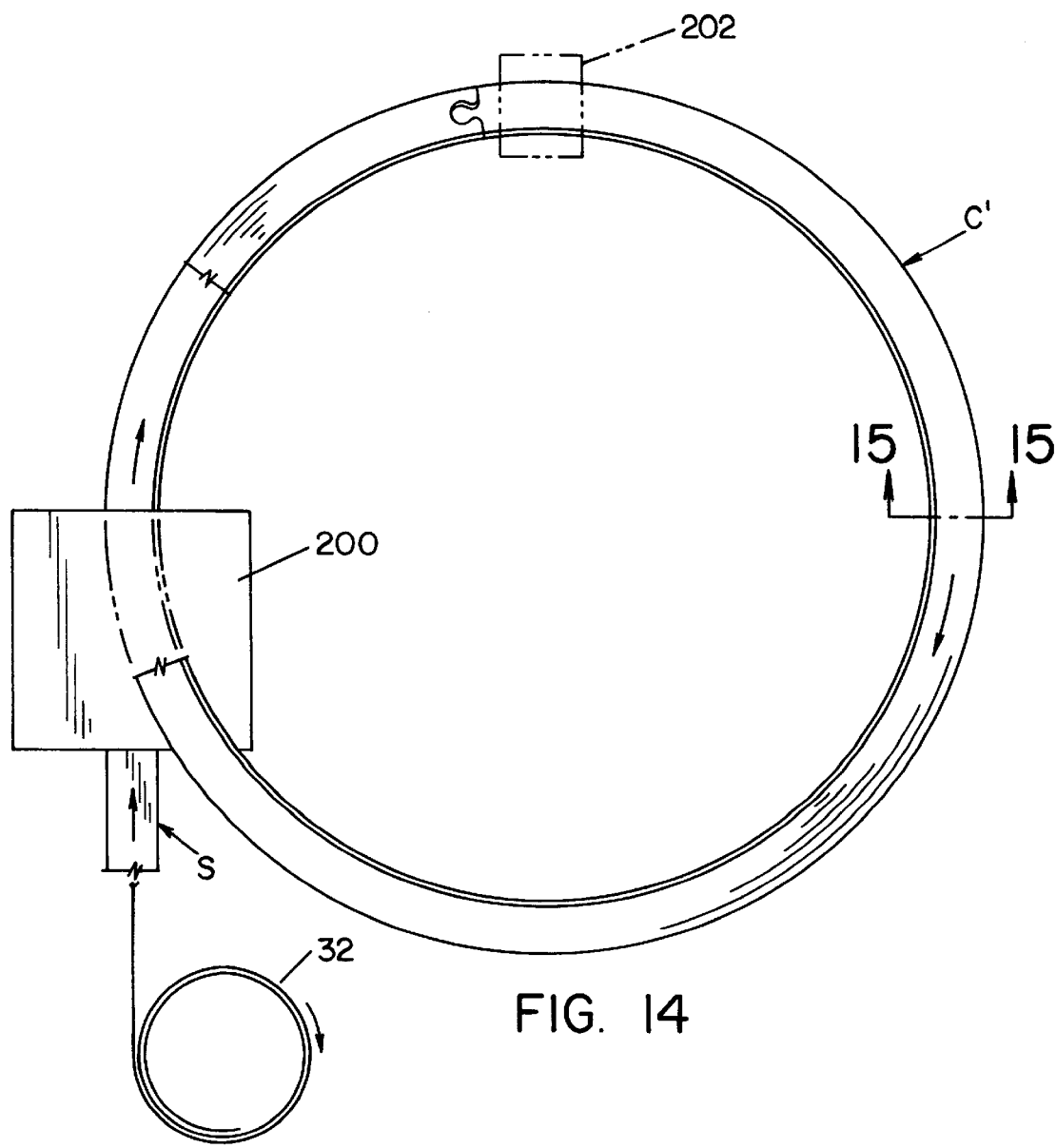
FIG. 14 is a top plan view, similar to FIG. 4, illustrating a modification of the present invention wherein the circular convolutions are inclined as they issue from the coiler to automatically produce the frusto-conical configuration of a Belleville spring.
Figure 15:
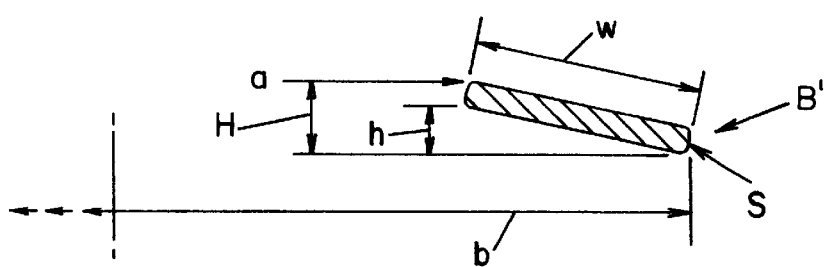
FIG. 15 is an enlarged cross sectional view taken generally along line 15—15 of FIG. 14.

Referring now to FIGS. 14 and 15, mechanical snap spring coiler 200 is modified to automatically form the frusto-conical configuration when coiling hardened spring strip S. The coiled strip S issuing from coiler 200 has a frusto-conical configuration wherein the diameter a is less than the outer diameter b by an amount substantially less than width w. Cutting station 202 performs the cutting processes illustrated in FIGS. 5 and 7. In this manner, the coiled strip S is formed into convolutions C' and cut into circular bodies. The bodies are provided with free ends having interlocking or dovetailed interlocking elements. In this fashion, the Belleville spring is manufactured merely by cutting the convolutions into circular configurations. This procedure avoids the heat set process illustrated in FIGS. 11 and 12. Since there is no heat set operation, coiler 200 distorts strip S transversely to a greater extent than when only a flat preform 100 is produced. By over distortion, the configuration springs back toward the original shape to create the desired frusto-conical configuration of Belleville spring B'. The Belleville spring is still a spring coiled from a hardened strip. The preferred embodiment using the steps shown in FIGS. 4, 11 and 12 has been practiced; however, the illustrated second embodiment illustrated in FIGS. 14–15 will produce a Belleville spring that does not require stamping, forming, heat treating, etc., as used in the prior art.

Figure 16:
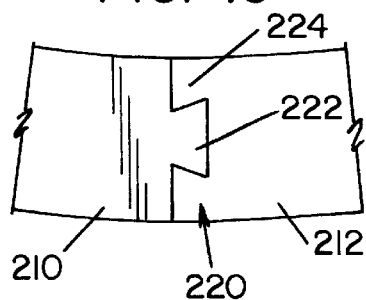
FIG. 16–23 are enlarged top views wherein the free ends of a Belleville spring constructed in accordance with the present invention with several interlocking male and female configurations.
Figure 17:
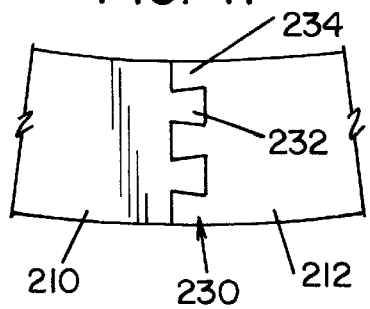
Figure 18:
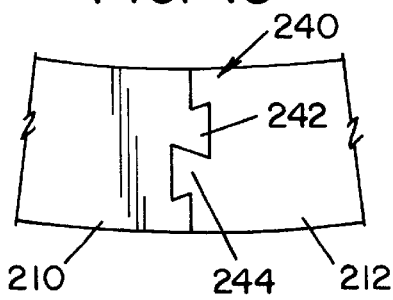
Figure 19:
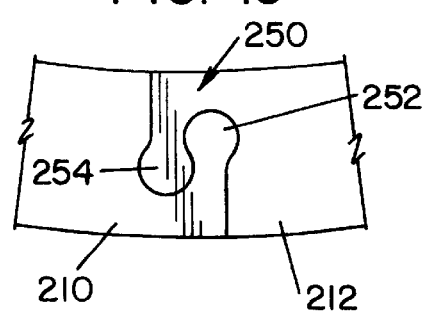
Figure 20:
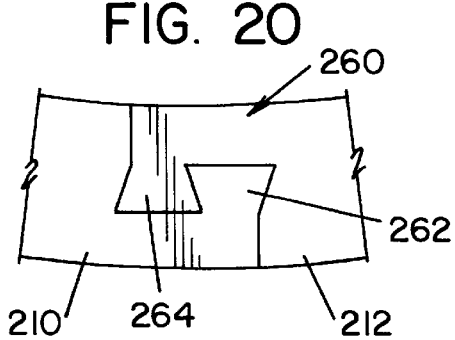
Figure 21:
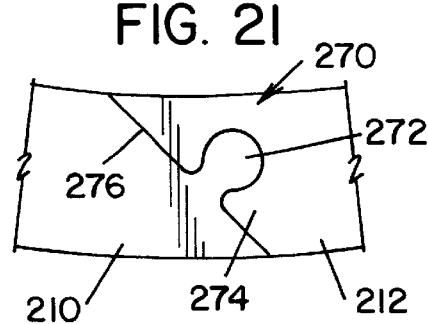
Figure 22:
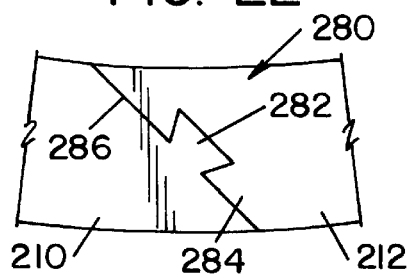
Figure 23:
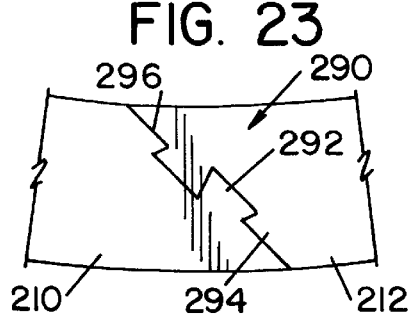

Referring now to FIGS. 16–23, free ends 210, 212, with or without a gap as shown in FIG. 10, have interlocking structures using matching interlocking elements or dovetails. In FIG. 16, interlocking means 220 include a dovetail element 222 fitting into recess element 224. In a similar manner, FIG. 17 uses interlocking means 230 with elements 232, 234 and FIG. 18 shows an interlocking dovetail means 240 with elements 242, 244. In FIG. 19, the interlocking means 250 includes transversely extending interlocking elements 252, 254 on free ends 210, 212, respectively. A similar arrangement using longitudinally spaced dovetails is shown as interlocking means 260 having elements 262, 264 in FIG. 20. FIGS. 21–23 include interlocking means 270, 280, 290, respectively, having interlocking elements 272, 274 and 282 and 284, 292 and 294. In these embodiments, the free ends 210, 212 are cut or stamped by the die cutting station along generally diagonal lines 276, 286 and 296, respectively. These interlocking means are permanently fixed together, or are used as merely interlocked elements. The Belleville spring generally maintains the engaged relationship between the interlocking means while it is in use. The respective elements could be formed simultaneously by a single punching or stamping operation by die cutting station 40 or by die cutting station 202 as shown in FIG. 7.

Figure 24:
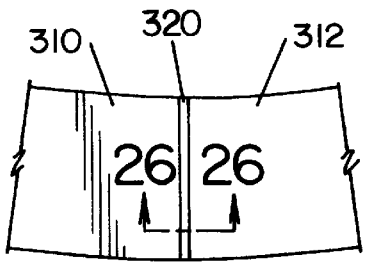
FIG. 24 is a top plan view showing the free ends of a Belleville spring constructed in accordance with the present invention wherein the free ends are butt welded together.
Figure 25:
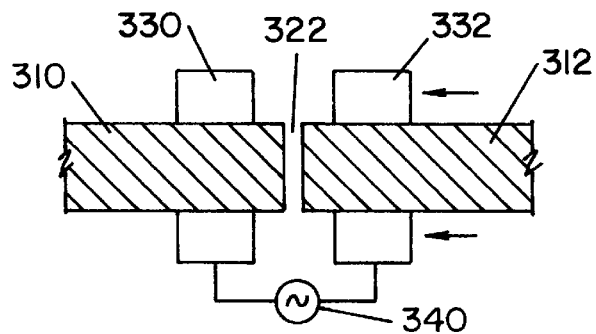
FIG. 25 is a side cross sectional view of the free ends of the Belleville spring showing schematically, the butt welding procedure.
Figure 26:
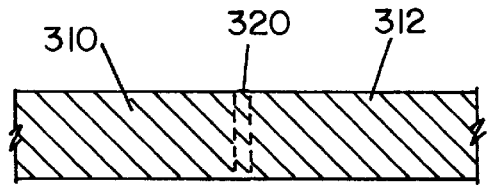
FIG. 26 is an enlarged cross sectional view taken generally along line 26—26 of FIG. 24; and, FIG. 27 is an enlarged view showing the free ends of a Belleville spring with an angular gap therebetween, which gap may be used for joining the free ends.

In FIGS. 24–26 free ends 310, 312 are butt welded together along line 320. As illustrated in FIG. 25, the free ends may have a space 322 after being cut by die cutting station 40 or by die cutting station 202. Clamps 330, 332 capture ends 310, 312 and move these ends together as a power supply 340 applies current between the ends 310, 312 to butt weld the ends along weld 320. The final product is shown in the cross sectional view in FIG. 26.

Figure 27:
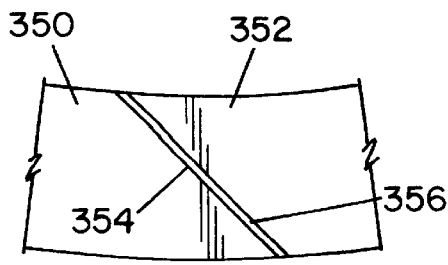

In FIG. 27, free ends 350, 352 are butt welded along the diagonal cut line 354 to form weld 356. Various processes could be provided for fixedly securing the free ends of the Belleville spring. In practice, the dovetail or interlocking elements illustrated in FIG. 9, or the dovetail elements illustrated in FIG. 16, are preferred. The interlocking means hold the free ends together without subsequent processing, such as welding or adhesively joining the interlocking elements.

Strip S of the example is purchased material having No. 1 rounded edges, which edges 150, 152 are shown in FIG. 6. This hardened spring steel strip is coiled into the desired convolutions and cut to create the interlocking or dovetail elements. Blank or preform 100 is then assembled with the interlocking elements together and formed in a heat set operation under pressure wherein preform 100 is held between two forming dies. The forming process is conducted at an elevated temperature, in practice, approximately 900° F. for about 1.0 minutes. Approximately 15–30 tons of pressure is applied between platens 112, 114. After the part is heat set, the hardness of the part is lowered by approximately 2–5 points on the Rockwell C scale. In forming the dovetail or interlocking elements, the die cutting station 40 or die cutting station 202 is added as a hydraulic cutoff to the outlet of a standard number W 775 Torin coiler, which coiler is modified to feed wire or strip S from a coil 32. The Torin coiler is standard equipment for producing snap rings. Internal cams in the coiler are used to adjust the radius r for convolution C. Other spring coilers could be used for coiling the flat preform 100, as shown in FIG. 9 or the frusto-conical convolutions C', as shown in FIG. 14.

Having thus defined the invention, the following is claimed:

1. A method of making a Belleville spring comprising the steps of:
    (a) mechanically coiling a flat strip of hardened spring steel into a continuous, generally flat circular convolution, the coiled strip having first and second parallel edges defining a width, the coiled convolution of the spring steel strip having a given radius of curvature and an axially extending center of generation where said first edge has a first formed radius and said second edge has a second formed radius, with said first radius being less than said second radius by an amount generally equal to said width of said strip;
    (b) cutting said coiled spring steel strip of said circular convolution to create a generally flat ring shaped spring with first and second free ends; and,
    (c) heating said flat ring shaped spring to a temperature of about 800° F. and forming the heated flat ring shaped spring under axial pressure to heat set said spring into a frusto-conical shape.

2. The method as defined in claim 1 wherein said heating step is performed for a time of at least about 0.5 minutes.

3. The method as defined in claim 2 wherein said temperature is in the range of 800° F. to 1000° F.

4. The method as defined in claim 2 wherein said time is at least about 1.0 minutes.

5. The method as defined in claim 2 wherein said time is in the range of about 1.0–2.0 minutes.

6. The method as defined in claim 1 wherein said spring steel has a hardness in the range of about C43–48 on the Rockwell C scale and said heating step reduces said hardness by about 5–10 points on the Rockwell C scale.

7. The method as defined in claim 6 including the additional steps of:
    (d) providing said free ends with interlocking elements; and,
    (e) interlocking said free ends before said forming step.

8. The method as defined in claim 6 wherein said free ends have a gap therebetween before said forming step and wherein said forming step closes said gap.

9. The method as defined in claim 1 including the additional steps of:
    (d) providing said free ends with interlocking elements; and,
    (e) interlocking said free ends before said forming step.

10. The method as defined in claim 9 wherein said interlocking step permanently affixes said free ends.

11. The method as defined in claim 10 wherein said free ends have a gap therebetween before said forming step and wherein said forming step closes said gap.

12. The method as defined in claim 9 wherein said free ends have a gap therebetween before said interlocking step.

13. The method as defined in claim 1 wherein said free ends have a gap therebetween before said forming step and wherein said forming step closes said gap.

14. A method of making a Belleville spring comprising the steps of:
    (a) mechanically coiling a flat strip of hardened spring steel into a continuous, generally circular convolution, the coiled strip having first and second parallel edges defining a width, the coiled convolution of the spring steel strip having a given radius of curvature and an axially extending center of generation where said first edge has a first formed radius and said second edge has a second formed radius with said first radius being less than said second radius by an amount substantially less than said width of said strip to provide a frusto-conical shape;
    (b) cutting the coiled spring steel strip of the frusto-conical convolution to create a frusto-conical ring shaped spring with first and second free ends having a gap therebetween; and,
    (c) releasably joining said free ends to close said gap and form a frusto-conical Belleville spring.

15. The method as defined in claim 14 including the additional steps of:
    (d) providing said free ends with interlocking elements; and,
    (e) interlocking said free ends during said joining step.

* * * * *